(12) United States Patent
Bevan et al.

(10) Patent No.: US 6,415,149 B1
(45) Date of Patent: Jul. 2, 2002

(54) METHOD AND APPARATUS FOR HANDOFF IN A CELLULAR RADIO COMMUNICATIONS SYSTEM

(75) Inventors: David Damian Nicholas Bevan, Bishops Stortford; Steven John Baines, Stansted Mountfitchet, both of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/198,388

(22) Filed: Nov. 24, 1998

(51) Int. Cl.7 ................................................ H04Q 7/22
(52) U.S. Cl. ........................ 455/442; 455/438; 455/439; 455/443; 375/347
(58) Field of Search ................................ 455/442, 436, 455/437, 438, 439, 443, 525, 561, 562; 375/347, 150

(56) References Cited

U.S. PATENT DOCUMENTS 5,953,382 A * 9/1999 Asano et al. ............... 375/347
6,097,954 A * 8/2000 Kumar et al. .............. 455/442
6,112,089 A * 8/2000 Satarasinghe .............. 455/437
6,240,292 B1 * 5/2001 Haberman et al. ......... 455/439

* cited by examiner

*Primary Examiner*—William Trost
*Assistant Examiner*—Philip J. Sobutka
(74) *Attorney, Agent, or Firm*—Lee, Mann, Smith, McWilliams, Sweeney & Ohlson

(57) ABSTRACT

In a cellular radio communications system, using for example spread-spectrum communication, handoff between signals in different cells or in different sectors of sectored cells can be used to provide diversity reception at a mobile station and at cell sites and so to improve the reliability of data decoding. In sectored cells the diversity between signals in adjacent sectors can be low if the fading of the signals is correlated. The invention thus improves diversity gain by prioritising handoff between sectors or cells providing or expected to provide greater signal diversity over handoff between sectors providing or expected to provide less signal diversity, such as between adjacent sectors in sectored cells. Signals are therefore selected for diversity combining on the basis of both signal strength and signal diversity.

1 Claim, 3 Drawing Sheets

METHOD AND APPARATUS FOR HANDOFF IN A CELLULAR RADIO COMMUNICATIONS SYSTEM

TECHNICAL FIELD

This invention relates to a method and apparatus for handoff in a cellular radio communications system. The invention finds particular application in multi-beam, or sectored, cells using spread-spectrum communication.

BACKGROUND OF THE INVENTION

Cellular radio communications systems are widely used throughout the world to provide telecommunications to mobile users. A geographic area covered by a cellular radio system is divided into cells, each containing cell site equipment at a cell site, through which subscriber units, such as mobile stations, communicate.

In general, an object of cellular radio communications system design is to reduce the number of cell sites required by increasing the range and capacity of the cell site equipment at each one. This is because cell sites are expensive, both because of the equipment required and because of the need for a geographical site. Geographical sites may be costly and may require extensive effort to obtain planning permission. In some areas, suitable sites may even not be available.

The communications ranges in many systems are uplink (mobile to cell site) range limited because of the limited power available at the subscriber unit, which may be a hand-portable subscriber unit. However, any increase in range would mean that fewer cells would be required to cover a given geographical area, thus advantageously reducing the number of cell sites and associated infrastructure costs.

When a cellular radio system is set up in an area of high demand, such as a city, then cell-site communications capacity, rather than range, usually limits cell size. Increased cell site capacity would therefore reduce the required number of cell sites and so reduce costs.

After a cellular radio system has been set up, demand may increase to exceed the capacity of the existing cell sites. A method of upgrading existing cell sites to increase capacity where required might then reduce costs because the capacity of the system could be increased without acquiring any new geographical sites or installing more cell sites.

One approach to increasing range and/or capacity, or to upgrade a cell, is to use directional antennas at a cell site physically to separate radiations at similar frequencies. This is known as sectorisation. It has been proposed to use three-sectored cells, having three antennas with nominally 120° azimuthal beamwidth, or hex-sectored cells, having six antennas with nominally 60° azimuthal beamwidth (as described for example in U.S. Pat. No. 5,576,717). In each case, one effect of the sectorisation is to reduce interference from mobiles and cell sites in adjacent and nearby cells, and thus to increase the total range and/or capacity of the cell site in a sectored cell relative to a cell using an omni-directional antenna.

In any cellular system, a subscriber unit may move from one cell to another, necessitating transfer of the communication link from one cell site to another by a process known as handoff. In a sectored cell, a subscriber unit may also move from one sector to another, necessitating additional handoffs between the sectors of the cell site.

One mode of communication used in cellular radio systems is spread-spectrum communication, such as code division multiple access (CDMA). In spread-spectrum systems, all cell site transmissions, both in different sectors and in different cells, may be in the same frequency band. A subscriber unit may then communicate with cell sites via more than one sector, in the same or different cells, at the same time. Signals to and from the subscriber unit in different cells, and usually those in different sectors are examples of diversity signals.

To receive diversity signals, a spread-spectrum or CDMA receiver usually comprises a rake receiver consisting of several, such as three or four, parallel correlators (commonly known as fingers). Each diversity signal carries the same information but is differently coded or arrives at the receiver with a different delay, and may be tracked and received independently by one of the fingers of the rake receiver. The combination of the strengths of the diversity signals is then used to improve demodulation of the transmitted data. While there may be fading on each diversity signal, the fades are generally independent. Demodulation based on the combination of several received signals therefore increases reliability. Multipath propagation of a wideband spread-spectrum or CDMA transmission often gives rise to a further plurality of independently receivable signals at a receiver. These multipath diversity signals can be used further to increase reliability of signal reception and decoding.

In a sectored cell, the beams in adjacent sectors must overlap each other to ensure continuity of coverage within the cell. Thus, if the number of sectors increases, then the number of subscriber units within overlapping beam areas may be expected to increase, especially when the wide-angle scattering effects of the channel are taken into consideration. In a spread-spectrum system this can increase the number of subscriber units receiving transmissions in different sectors and would therefore be expected to increase the opportunities for receiving diversity transmissions.

However, a subscriber unit positioned in the overlap between two sectors covered by beams generated by two closely-spaced antennas may experience very little diversity between signals on those beams. This is because the paths of the signals would be very similar, so that the signals cover similar path lengths and are subject to similar fading conditions. Therefore, the signals are likely to be correlated in their fading. This is likely to be a problem particularly in cells having about six or more sectors.

As the number of sectors in a cell increases, it has been proposed to reduce antenna complexity at the cell site by generating beams for more than one sector from a single antenna, such as a phased-array antenna. Although this advantageously simplifies the hardware, or cell site equipment, at the cell site, it also increases the likelihood of correlated fading of beams in adjacent sectors and so would be expected disadvantageously further to reduce the diversity between such beams.

SUMMARY OF THE INVENTION

An object of the present invention is to overcome the problem of reduced diversity in sectored cells described above.

A further object of the present invention is to increase the diversity in transmissions used for communication to and from a mobile station in a sectored-cell system.

The invention in its various aspects is defined in the appendent independent claims, to which reference should now be made. Preferred or advantageous features of the invention are set out in dependent subclaims.

The invention is implemented in a cellular radio system which preferably uses spread-spectrum communication, and particularly preferably uses CDMA communication.

In a CDMA system, after a call is set up to or from a subscriber unit, such as a mobile station, via a first sector of a sectored cell, the subscriber unit scans for pilot signals from neighbouring or nearby sectors or from neighbouring or nearby cells (which may be sectored or unsectored). If it finds a pilot signal of sufficient strength it transmits a control signal via the first sector identifying the source of the pilot signal. The system may then initiate a handoff by supporting the call simultaneously via both of the sectors or cells. This process may then be repeated. In this way the subscriber unit may receive transmissions via as many sectors or cells as it has available fingers in its rake receiver.

While receiving two or more transmitted signals at once, a subscriber unit is in handoff. In this state the diversity of the two or more signals may be used to enhance the overall received signal. However, in a sectored cell, downlink (forward link) signals in separate sectors may have a high correlation in their fading, especially if they are derived from a common antenna or closely-spaced antennas at the cell site. Thus, not much diversity gain may be expected to be derived from these signals.

By contrast, signals from different cell sites in different cells certainly will be uncorrelated and so would lead to significant diversity gain. However, a subscriber unit can only be in handoff with a limited number of diversity signals.

In a conventional receiver, diversity signals are selected for combination only on the basis of their signal strength without consideration of their expected or actual degree of correlation, or diversity.

The invention therefore aims to increase diversity benefit during handoff by enabling the subscriber unit, and the cell sites or a base station controller, to select signals for decoding on the basis of the expected diversity of the signals as well as on the basis of signal strengths.

A subscriber unit may be, for example, a mobile station or a fixed wireless access (FWA) station. The following specific embodiments refer mainly to mobile stations but, as the skilled person would appreciate, a number of aspects of the embodiments apply also to FWA.

The meaning of correlation in relation to radio signals is well-known to the skilled person from, for example, the text book "Digital Communications", 2nd edition, by John G. Proakis, published by McGraw-Hill Book Company, 1989 (ISBN 0-07-100269-3), which is incorporated herein by reference.

DETAILED DESCRIPTION OF THE SPECIFIC EMBODIMENTS

Specific embodiments and the best mode of the invention will now be described by way of example, with reference to the drawings, in which.

The following specific description relates principally to a cell type referred to herein as TC9S, which is nine-sectored and uses CDMA communication. The description will briefly describe this cell type, and relevant aspects of CDMA communications technology, before considering the invention in more detail.

The TC9S Cell

Figure 1:
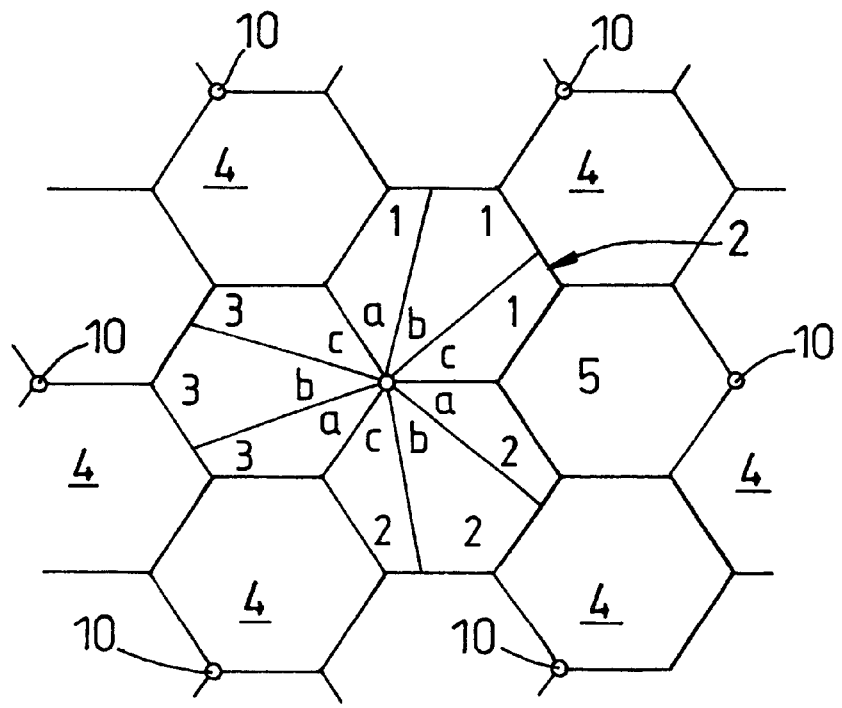
FIG. 1 is a schematic plan view of a portion of a cellular communications network, including a nine-sectored cell.

A nine-sector TC9S cell 2 is shown in FIG. 1, surrounded by neighbouring cells 4, which may be TC9S cells or any other type of compatible cell. The TC9S cell 2 comprises nine sectors a1, b1, c1, a2, b2, c2, a3, b3, c3 of approximately 40° azimuth surrounding its centre.

The overall shape of the nine-sector cell 2 is formed of three approximately hexagonal lobes, each having a corner at the cell centre. Three, three-sector BTSs 6 are co-located at the cell site 5. Each three-sector BTS 6 controls three adjacent sectors a, b, c covering one of the hexagonal lobes of the cell. Each BTS is a Nortel IS-95 CDMA BTS, manufactured by Northern Telecom Limited, World Trade Center of Montreal, 380 St. Antoine Street West, 8th Floor, Montreal, Quebec H2Y 3Y4, Canada.

Each group of three sectors, forming a larger, 120° sector, controlled by a single BTS will be referred to herein as a trisector. In different embodiments a trisector may be one corner-excited hexagon (as shown in FIG. 1) or one third of a centre-excited hexagon.

Figure 2:
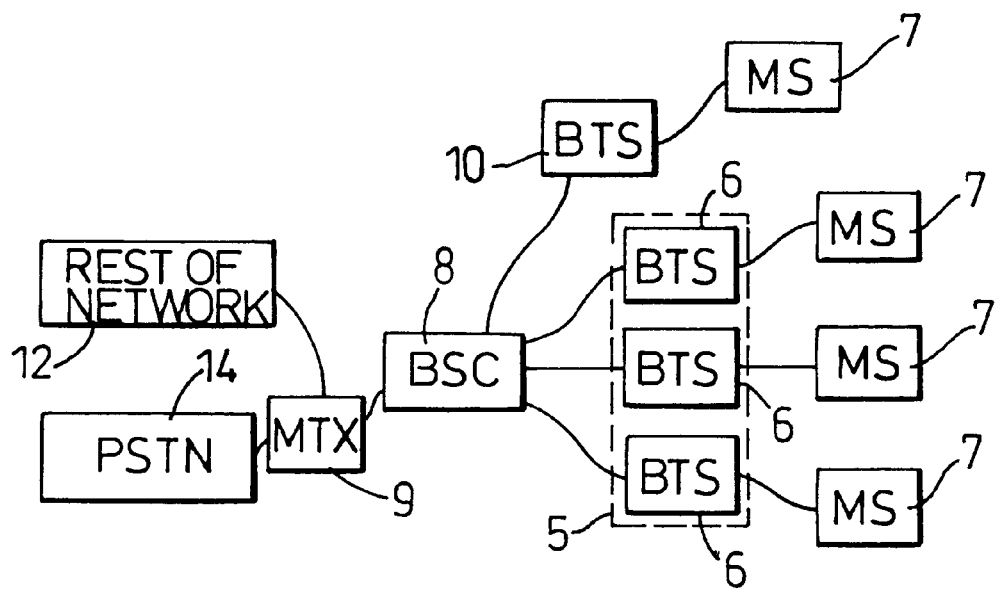
FIG. 2 is a block diagram of a portion of the cellular communications network of FIG. 1.

As illustrated in FIG. 2, each three-sector BTS 6 at the cell site 5 is connected independently to a base station controller (BSC) 8, which may be some distance from the cell. The BSC is also connected to the BTSs 10 of nearby cells, to the remainder of the network 12 and, typically, to the public switched telephone network (PSTN) 14. Each BTS can communicate with one or more mobile stations (MSs) 7. The three co-located BTSs 6 are not connected directly to each other.

Each three-sector BTS 6 controls communication with mobile stations within all three sectors of its trisector, and when a mobile station moves from one sector of the trisector to another the BTS 6 can control handoffs with reference to the BSC. The BSC is informed of each handoff. These are termed softer handoffs, and contrast with handoffs as mobile stations move between trisectors controlled by different BTSs or between different cells. The latter two handoffs can only be controlled by the BSC instructing the BTSs of both trisectors or cells (in known manner), and are termed soft handoffs.

Figure 3:
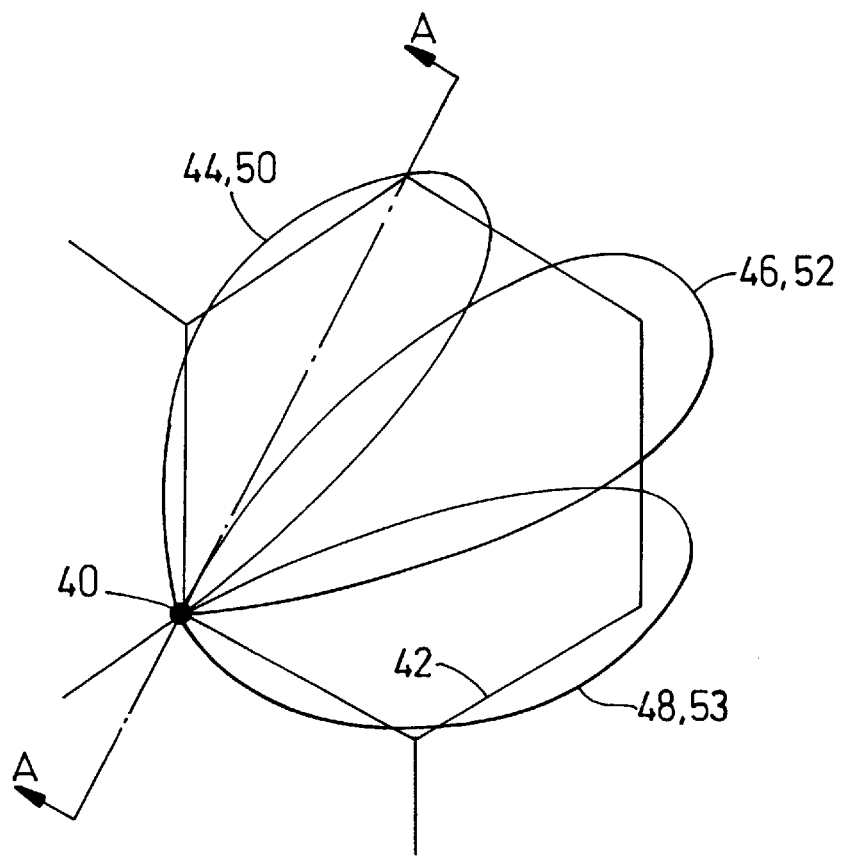
FIG. 3 is a schematic plan view of the footprints of the uplink and downlink beams of a 120° trisector of a TC9S cell.

FIG. 3 illustrates schematically the coverage areas, or footprints, of the beams from one IS-95 BTS 40 covering one 120° trisector 42 in a TC9S cell.

Each IS-95 BTS has three outputs and six inputs. On the downlink, the three outputs generate three main beams, each covering a 40° sector of the trisector. The three main beams 44, 46, 48 are also used on the uplink, using three of the six BTS inputs.

Figure 4:
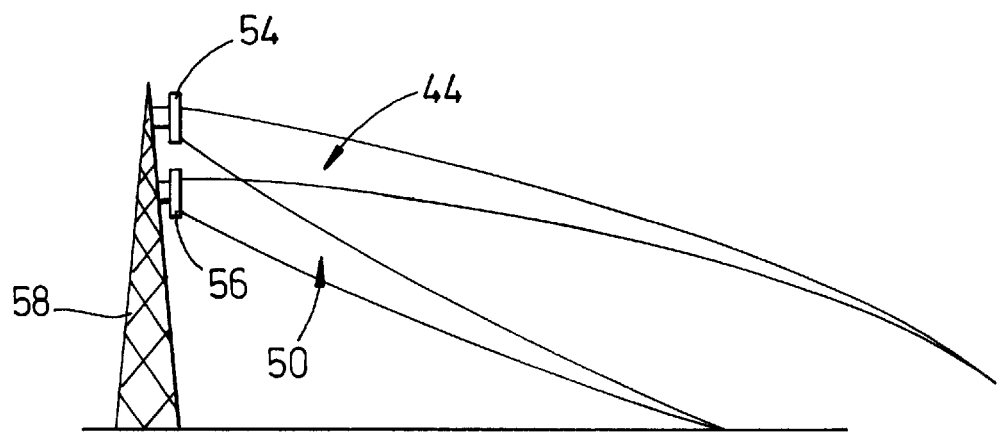
FIG. 4 is a schematic view in elevation of two of the beams of FIG. 3, sectioned on A—A in FIG. 3.

The main beams may be generated by three separate antennas or antenna facets, or by one phased-array antenna facet 54 driven in known manner. The antenna 54 in FIG. 3 may be mounted on an antenna mast 58, as shown in FIG. 4. As a result of factors well-known to the skilled man, the footprints of the main beams 44, 46, 48 overlap to provide coverage throughout the trisector 42.

On the uplink, three diversity beams 50, 52, 53 are also generated, using the three remaining inputs of the BTS. The diversity beams may be generated by three separate antennas or by one phased-array antenna facet 56, and cover similar areas to the main beams. The diversity antenna is spaced from the main antenna, preferably by about 3 meters (diversity-spaced), to ensure uncorrelated uplink fading (spatial diversity) between the main and diversity beams. The main and diversity antennas 54, 56 are shown vertically spaced in FIG. 4 for clarity. In practice, these antennas would normally be horizontally spaced.

As well as the nine-sectored cell described, a three- or six-sectored cell may similarly be implemented using one or two IS-95 BTSs (or other three-sector BTSs) respectively. In a six-sectored cell, each BTS covers three 60° sectors, which form a larger, 180° sector or trisector. In principle, a cell containing any multiple of three sectors, such as 12 or 15, may be implemented using IS-95 BTSs (or other three-sector BTSs) in this way.

Background Technology—Code Division Multiple Access

CDMA is a modulation and multiple access scheme based on spread-spectrum communication, a well-established technology that has been applied recently to digital cellular radio communications. Multiple access allows simultaneous communications on many channels between a BTS and a number of mobile stations. In CDMA, these channels are carried in the same, relatively broad, band of frequencies. The bandwidth is typically 1.25 MHZ in IS-95. The signal (assumed to be vocoded, coded, interleaved etc.) in each CDMA channel is spread with a different pseudo-random (PN) binary sequence before being used to modulate an RF carrier. A large number of CDMA signals can share the same frequency band. The signals are separated in a receiver using a correlator, which isolates a particular channel by accepting only signal energy from the selected PN sequence assigned to that channel and despreads its spectrum. Signals on other channels, whose PN sequences do not match, are not despread and, as a result, contribute only weakly to the noise and represent a self-interference generated by the system.

Further background information about CDMA is given in "New Concepts in Multi-user Communications": Proceedings from The Advanced Study Institute Conference on Concepts in Multi-user Communication, Ed. J. K. Skwirzynski. NATO, UK, August 4–16, 1980, which is incorporated herein by reference.

The use of CDMA in mobile communications is specified by Telecommunications Industry Association/Electronics Industry Association (TIA/EIA) standards and draft standards, which are incorporated herein by reference including TIA/EIA/IS-95-A, Mobile Station-Base Station Compatibility Standard for Dual-Mode Wideband Spread Spectrum Cellular System, May 1995, Specification, January 1992.

CDMA Pilot Signals

A different pilot signal is transmitted in each sector, which is used by mobile stations to obtain initial system synchronization and to provide robust time, frequency, and phase tracking of the signals from the BTS. Variations in the transmitted power level of the pilot signals control the coverage area of the cell in known manner.

Pilot signals are transmitted in each sector using the same (unmodulated) pseudo-random (PN) code but with different spread-spectrum-code phase offsets, allowing them to be distinguished. The fact that the pilots all use the same PN code allows a mobile station to find system timing synchronization by a single search through all code phases. The strongest signal found corresponds to the code phase of the BTS nearest to, or transmitting most strongly to, the mobile station.

Each BTS also transmits a setup or sync channel in each sector in known manner. This channel uses the same PN code and phase offset as the pilot channel and can be demodulated whenever the pilot channel is being tracked. This sync channel carries cell site identification, pilot transmit power, and the sector pilot PN code phase offset. With this information, the mobile station can establish system time and estimate the proper transmit power to initiate calls.

Conventional Mobile-Station-Assisted Soft Handoff

A handoff mechanism allows a telephone call to continue when a mobile station crosses the boundary between two cells or sectors.

A soft handoff in a CDMA system occurs when a mobile station moves from an area served by a first BTS to an area covered by a second BTS. This can be a movement from one cell to another or between sectors covered by different BTSs in the same cell. Each BTS broadcasts a pilot signal in each sector which it covers. The strength of each pilot signal determines the area of coverage of each sector in known manner.

At call initiation, a mobile station is provided with a list of BTSs or cell sectors which are most likely candidates for a handoff during the call, a set of handoff signal-strength thresholds (including an add threshold and a drop threshold), a strength margin and a time margin.

A CDMA mobile station typically has a rake receiver with three receiver fingers and a searcher (though some types may have more). In the typical case the mobile station may assign one finger to track the signal from the BTS which set up the call and two fingers to track the strongest other two BTS signals from the list, while the searcher scans for other useful signals. The searcher finger may not only monitor the strengths of pilot signals from other BTSs on the list but may also find other pilot signals from other, new BTSs, in which case it may cause the mobile station to modify its list of candidates for soft handoff. The list is transmitted via the BTS to the BSC whenever it is requested, whenever the list changes by having a new pilot appear on the list, or whenever an existing pilot falls below a level that is useful to support the communications traffic.

When a mobile station communicating via a first BTS moves away from the area of coverage of the first BTS towards that of a second, the pilot signal strength from the second BTS typically increases until it exceeds the add threshold. At this time, the mobile station sends a control message via the first BTS to the BSC. The BSC responds by commanding the mobile station to commence communicating with the second BTS as well as the first, and commanding the second BTS to commence transmitting and receiving the telephone call data to and from the mobile station. The mobile station then uses diversity combining of the two signals to enhance the overall received signal. Power control information is received from both BTSs; both BTSs have to request a power increase for the mobile station to increase its power. (Uplink-open-loop power control, uplink-closed-loop power control, and downlink power control are employed in known manner). Data from the mobile station are received by both BTSs and are forwarded to the BSC where the better (BTS) source is selected on a frame-by-frame basis. (More complex diversity combining is not generally used at the BSC, although in principle it could be used).

It will be appreciated that a BTS manages handoffs differently from a mobile station. Each BTS therefore continues to broadcast only its pilot signal (and sync, paging and other traffic channels) unless the BSC tells it that the mobile station has received the pilot signal sufficiently strongly (above the add threshold) to request that a communications link be set up with that BTS. Under the control of the BSC, the BTS then forms one of the two or more links on which communications are carried during the soft handoff.

During this state of two(or more)-way linkage, the mobile station is said to be in soft handoff.

The two-way linkage described above can be terminated in several ways depending on the movement of the mobile station. It can be terminated by returning to the first BTS only, or by dropping the first BTS in favour of the second, or by initiating tracking another BTS prior to completion of the handoff. In each case a communications link is dropped if the signal strength received at the mobile station on that link falls below the drop threshold for longer than the time margin.

Signal strength in CDMA is in practice evaluated in terms of the parameter $E_c/I_o$, which is the ratio of energy per chip to the noise power spectral density in a received CDMA signal.

Conventional Softer Handoff

As is known from the prior art, a softer handoff is the mechanism for handling the link between a mobile station and a BTS when the mobile station moves between two sectors of a cell covered by the same BTS, as in a TC3S cell. In a softer handoff, the mobile station functions exactly as in a soft handoff, as described above, but the BTS functions differently. As for a soft handoff, if a mobile station detects a pilot signal rising above the add threshold it sends a command message to initiate a handoff. The mobile station cannot know whether this will be a soft or softer handoff.

In a soft handoff, the BTS receiving the command message passes it to the BSC which controls the handoff procedure. But if the BTS receives a command message requesting initiation of a handoff between two of its own sectors, it intercepts the command message and, with reference to the BSC, directly initiates transmission and reception in the new sector. The BTS thus provides a parallel, two-way (or more) linkage during softer handoff as is provided by two or more BTSs during soft handoff. The BTS uses a diversity combiner to combine signals received from the mobile station in each sector, thus increasing diversity until the softer handoff is completed, for example by termination of either the link in the original sector or the link in the new sector, depending on the movement of the mobile station.

During softer handoff, the BSC is notified of the procedure but has limited involvement.

Handoff in a 9-Sector TC9S Cell

As described above and illustrated in FIG. 1, a TC9S cell comprises three co-located IS-95 BTSs at its centre, each handling a trisector. Therefore, if a mobile station moves within the cell from one sector to another, a softer handoff is required if both sectors are handled by the same BTS and a soft handoff is required if the sectors are in different trisectors and so handled by different BTSs.

An IS-95 BTS which has allocated a forward (downlink) channel on any of its three 60° sectors will search for corresponding mobile station uplink signals on all of its antenna inputs, which cover the full 120° trisector covered by the BTS. This means that if a BTS has a downlink to a mobile station in any sector, the uplink is effectively always in softer handoff to all three sectors of the trisector.

Correlated Beam Fading

The problem of correlated beam fading in sectored cells has been described above. In summary, however, if two signals which have undergone correlated fading are decoded and combined at a receiver, the diversity benefit will be less than if two differently-fading, uncorrelated, signals of similar mean powers are decoded and combined. Alternatively stated, if several multipaths with similar mean powers are available at a receiver, diversity benefit will be greater if uncorrelated multipaths are combined.

Figure 5:
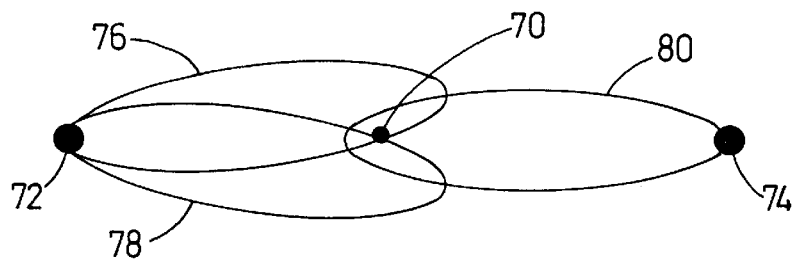
FIG. 5 illustrates in plan view a mobile station positioned within the areas of coverage of two adjacent sectors of a first cell and one sector of a neighbouring cell.

A situation in which this problem may arise is shown in FIG. 5, which illustrates schematically a mobile station 70 positioned in the coverage areas of two BTSs 72, 74 at neighbouring cell sites. The mobile station is within the beams of two adjacent sectors 76, 78 of one BTS 72 and within the beam of one sector 80 of the other BTS 74. The cells may both be TC9S cells or some other type of multi-sectored cell, or they may be different cell types.

The mobile station 70 is assumed to be in a region where it receives approximately equal pilot signal energies from beams 76 and 78 of BTS 72, and from beam 80 of BTS 74.

The signals on beams 76 and 78 are likely to have correlated fading, particularly if beams 76 and 78 are generated by a phased-array antenna, whilst beam 80 will be independently fading. If beams 76 and 78 are completely correlated then combining the two will give no net benefit. This is because, although combining the two correlated beams will theoretically give 3 dB combining benefit due to the increased total signal strength obtained by receiving both beams, 3 dB more power is transmitted than if signals were transmitted on one beam alone (either beam 76 or 78). This is essentially because the two beams use different outer PN spreading codes. By contrast, in accordance with an embodiment of the invention, combining uncorrelated beams 76 and 80, or beams 78 and 80 would additionally give diversity benefit.

In general, if a mobile station is positioned so that it can receive signals on two sectors of the same BTS (such as sectors 76 and 78) then it may be advantageous to transmit on the downlink on only one of the two sectors. In CDMA systems it is always desirable to minimise the amount of power transmitted by BTSs and mobile stations in order to reduce interference to third parties. Therefore, if there may be no combining benefit to be gained by the mobile station, the only effect of transmitting from a BTS on two sectors to the same mobile station may be disadvantageously to increase the total power transmitted by the BTS. In practice, if a mobile station requires improved reception for any reason, it would usually be preferable simply to increase the power transmitted to it by the BTS in one sector rather then to transmit simultaneously in two adjacent sectors. It should be noted that the sector in which the BTS transmits to the mobile station should be selected, as far as possible, to be the sector in which the lowest BTS transmit power is required. It should also be noted that the situation is different on the uplink, where the mobile station transmits in all directions. In that case, if the BTS has sufficient receiver resources, it should usually receive all available signals from the mobile station to optimise uplink reception.

In addition, if two beams from the same BTS in different sectors, such as beams 76 and 78, are combined and beam 80 from another BTS is not, there is a high probability that beams 76 and 78 may fade simultaneously to a lower strength than beam 80, in which case the signals on beams 76 and 78 would be swamped by interference from beam 80. If either beams 76 and 80, or beams 78 and 80, are combined then this cannot happen. This is because beams 76 and 78 are correlated in their fading, and so tracking one of them is sufficient to prevent the other one from being able to swamp the signals that are being used.

This aspect of the invention may also advantageously be applied to fixed wireless access (FWA) in which stationary subscriber units communicate with BTSs in a cellular network. In FWA the fading from all sectors approaches the static (no fading) case. It is then advantageous to transmit from the BTS only in the sector with the best received pilot signal power. There is no diversity benefit available and the fading-swamping effect described above does not occur when subscriber units are fixed.

As exemplified by the specific embodiments described below, the invention relates in several aspects to the method by which the mobile station and the network, in the form of the BSC and the BTSs, select signals in different sectors for combining in order to increase diversity.

Downlink Beams with Correlated Fading

According to a first embodiment of the invention, the network, or the BSC controlling the BTSS, seeks where possible to prevent a mobile station from combining signals from adjacent cell sectors between which diversity is expected to be low by excluding the corresponding pilot signals from the handoff process. Thus, if a call is set up between a BTS and a mobile station in a particular sector, the system provides the mobile station with a list of pilot signals which does not include the pilot signals of adjacent sectors. In particular, the list can omit the pilot signal of a sector adjacent to the sector in which the call was set up if the two sectors are handled by the same BTS and especially if they are covered by beams generated by closely-spaced antennas, or the same phased-array antenna.

Referring to FIG. 5, the first embodiment of the invention operates as follows. If a call is initially set up between BTS 72 and the mobile station 70 in sector 76, the BSC sends the mobile station a list of pilot signals including sector 80 of BTS 74 but not sector 78 of BTS 72. The mobile station may then be forced to ignore sector 78, which would be likely to have low diversity with adjacent sector 76, and to track sector 80, which is likely to have high diversity with sector 76.

The first embodiment of the invention may be implemented in the software or hardware of the system. Compared to a conventional system it would be necessary to modify the algorithm by which the system assembles the active list of pilot signals for which the mobile station's searcher searches. This requires knowledge of which sectors in the system are likely to suffer correlated fading, which is information most easily stored at the BSC. The algorithm which the BSC uses to assemble the active list for transmission to the mobile station at call set up would therefore need to be modified according to the first embodiment of the invention.

The benefits of the method and apparatus of the first embodiment would be expected to vary according to the environment of the cell site. Referring for example to FIG. 5, if the environment contains many buildings, which would cause significant multipath diversity of the beams in each sector, and if the mobile station 70 has three receiver fingers, then all three fingers may advantageously receive independently-fading multipath signals in sectors 76 and 80. However, if the environment is such that little multipath diversity occurs, it might be more beneficial for the three receiver fingers to receive signals in sectors 76, 78 and 80 as might be expected in a conventional system, despite the low diversity between sectors 76 and 78. (As has already been noted, this would depend on the degree of diversity between sectors 76 and 78. If signals in sectors 76 and 78 are highly-correlated there is unlikely to be any benefit in using both, and signal reception is likely to be just as good if only the sector providing the stronger signal is used for BTS transmissions).

There may therefore be more advantage to be gained by implementing the first embodiment of the invention in high-dispersion environments than in lower-dispersion environments.

Figure 6:
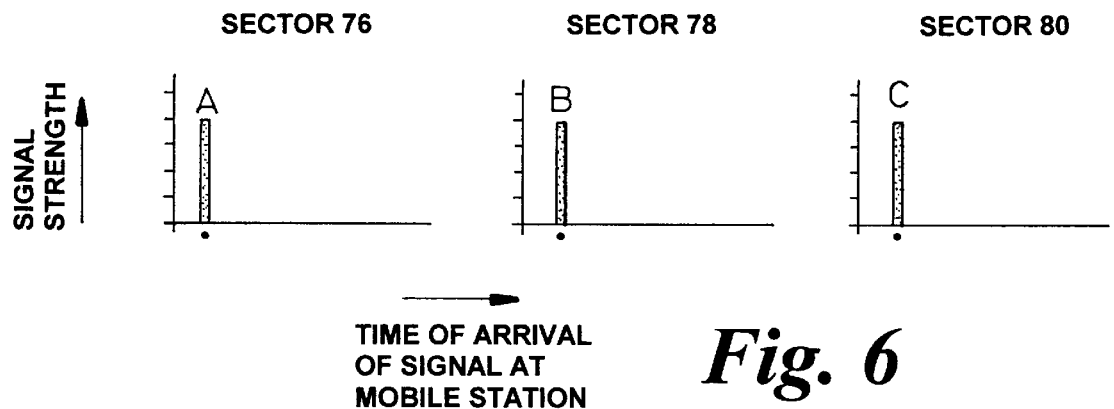
FIG. 6 shows plots of signal strength vs. time of arrival at the mobile station for signals in the three sectors illustrated in FIG. 5, assuming a low-diversity environment.
Figure 7:
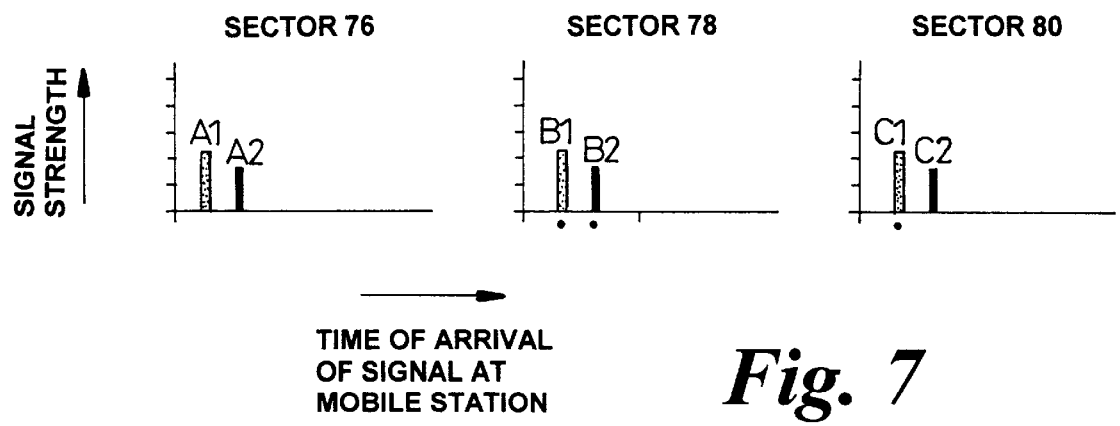
FIG. 7 shows plots of signal strength vs. time of arrival at the mobile station for signals in the three sectors illustrated in FIG. 5, assuming a high-diversity environment.

FIGS. 6 and 7 illustrate this effect. Each figure plots, on three separate graphs, signal strength against time of arrival for possible signals which might be received at the mobile station 70 in each of sectors 76, 78 and 80. FIG. 6 relates to a low-dispersion environment and FIG. 7 to a high-dispersion environment. Given that the mobile station has three receiver fingers, signal reception may be optimised in the low-diversity environment illustrated in FIG. 6 by receiving the single signal received in each sector. These are designated signals A, B and C in FIG. 6.

In practice, reception of the three signals A, B and C in FIG. 6 may be achieved even if, according to the first embodiment of the invention, the pilot signal for signal B in sector 78 is excluded from the list of pilot signals provided to the mobile station at call initiation. This is because, if the searcher of the mobile station receiver detects a pilot signal of strength greater than the add threshold which is not on the list of pilot signals provided to it, and the mobile station rake receiver has an unoccupied receiver finger, then the mobile station may request a handoff with the new pilot signal. Therefore, if A, B and C are the only signals receivable by the mobile station above the add threshold and it has three receiver fingers it can in principle request a three-way handoff between A, B and C. However, for the reasons described above under the heading "Correlated Beam Fading" there may be no advantage in combining the correlated signals A and B and to do so may disadvantageously increase the total power transmitted by BTS 72. In this situation the BSC and BTSs may advantageously set up a two-way handoff between signals A and C or signals B and C.

In the high-dispersion environment illustrated in FIG. 7, it is assumed that the mobile station receives two multipath diversity signals in each sector, one of higher signal strength than the other. If the mobile station were to decode the three strongest signals (as in the prior art) it would decode the stronger signal from each sector, designated signals A1, B1 and C1 in FIG. 7. However, this would not optimise signal decoding because the fading of signals A1 and B1 in sectors 76 and 78 is expected to be correlated. Greater diversity can be achieved by decoding, for example, signals B1, B2 and C1, i.e. the two uncorrelated multipath signals in sector 78 and the stronger uncorrelated multipath signal in sector 80. Note that although B2 is weaker than A1, combining B1, B2 and C1 may offer better performance than combining A1, B1 and C1 if A1 and B1 are highly correlated. (Alternatively, signals A1, A2 and C1 could be decoded, achieving equivalent diversity). This improvement can be achieved according to the first embodiment of the invention by excluding one of sectors 76 and 78 from the list of pilot signals to be tracked by the mobile station.

It would be advantageous if the system could distinguish between the situations illustrated in FIGS. 6 and 7. However, the only information that a conventional mobile station sends to the BTS about the pilot signals it has detected is an estimate of the total resolvable energy for each pilot signal. This information is not sufficient to allow the system to distinguish between the low and high dispersion situations of FIGS. 6 and 7. However, according to a further aspect of the first embodiment of the invention, the mobile station can advantageously be modified to transmit to the BTS additional information to allow the system, preferably controlled by the BSC, to instruct the mobile station to decode the appropriate pilot signals or pilot signal multipath components to optimise data reception. This information would include the number of pilot signal multipath components (of useful signal strength) detected by the mobile station and the energy distribution among these components.

According to a further embodiment of the invention, in which it may not be necessary to modify the mobile station, the network itself may control the handoff state of the mobile station to improve reception at the mobile station. In this embodiment, when the mobile station detects a new pilot signal of sufficient strength from a new sector it may report this information to the network in the normal way, requesting a handoff so that it can communicate via the new sector. Conventionally, the network would enable the new handoff as requested. (If the new handoff is a softer handoff, the BSC controls this process; if it is a softer handoff, the BTS controls the process). However, according to this embodiment of the invention the network is aware of the current handoff state of the mobile station and can therefore assess whether the newly-requested handoff is likely to increase diversity, and therefore signal reception quality, or whether the sector for which the new handoff is requested is likely to be correlated with a sector in which the mobile station is already communicating. In the latter case, the newly-requested handoff may be unlikely to improve signal reception quality and so the network may refuse to implement the newly-requested handoff.

In order to implement this embodiment it may be advantageous to modify the mobile station so that, once a handoff request has been refused, it does not continue to request the same handoff. For example, it may wait for a predetermined time before resubmitting the same handoff request. Also, it may be advantageous to modify the network, particularly if it contains BTSs which handle softer handoffs independently of a BSC and in which the BSC handles soft handoffs, to ensure for example that a BTS does not implement a new softer handoff without either being aware of the current handoff status of the mobile station or referring to the BSC, which may keep a record of the current handoff status of the mobile station. Advantageously, if the mobile station's handoff status is stored only at the BSC, any BTS should refer to the BSC before implementing a newly-requested softer handoff.

Pilot Signal Ordering

As described above, when a call is set up, a list of pilot signals (the neighbour list) is supplied by the BSC to the mobile station and, during the call, the mobile station searches for those pilot signals. When the mobile station detects a pilot signal of power exceeding the add threshold ($T_{add}$) it reports the fact to the network and identifies that pilot in a candidate set. If the network then sets up a handoff with a pilot signal from the candidate set, that pilot is identified in an active set. According to a second embodiment of the invention, the BSC places the pilot signals in the neighbour list in order so that signals having correlated fading are widely separated in the list. The BSC is aware of the mobile station's approximate location because it knows in which sector it is currently communicating with the mobile station. Therefore, sectors likely to have correlated fading with the current sector will be placed low down in the neighbour list and sectors likely to be uncorrelated with the current sector will be placed near the top of the list. In addition, sectors which are likely to suffer correlated fading with each other are separated from each other on the list. The mobile station then searches for pilot signals in the order that they are listed in the neighbour list. The probability that the mobile station will request handoffs which combine uncorrelated signals is therefore increased by placing uncorrelated signals at the beginning of the list and correlated signals towards the end. The mobile station would still need to select pilot signals or pilot signal components on the basis of signal strength but if it receives enough uncorrelated signal components of sufficient strength to occupy all of its receiver fingers using only the uncorrelated pilot signals at the head of the list, then signal reception can be improved. If any of the initially allocated (uncorrelated) pilot signal components become weaker (slow fade due to e.g. shadowing) and the fingers need to be reassigned using pilot signals further down the list, the ordering of the pilot signals in the active list may cease to be of importance.

By way of example, in the situation illustrated in FIG. 5, the pilot signals for sectors 76, 78 and 80 would preferably be provided to the mobile station 70 in one of the following orders: 76, 80, 78; 78, 80, 76; 80, 76, 78; 80, 78, 76. The pilot signals should not be provided in either of the following orders: 76, 78, 80; 78, 76, 80. Thus, the mobile station 70 is forced to search first for pilot signals in two uncorrelated sectors.

Advantageously, the network would determine the precise order of the pilot signals (i.e. whether to prioritise sector 76 or sector 78) on the basis of the expected position of the mobile station, which may for example be estimated on the basis of signal strengths received from the mobile station in each sector.

Pilot Signal Tagging

Instead of ordering the pilot signals in terms of their expected correlation as described above, the network, for example the BSC or the BTS, may use similar criteria to tag pilot signals as "correlated" or "uncorrelated" when defining the pilot neighbour list. The mobile station may then prioritise uncorrelated pilot signals when it detects new pilot signals.

Pilot Signal Prioritisation

A mobile station conventionally reports received pilot signal strengths in a pilot strength measurement message (PSMM). In a further embodiment, the network (for example at the BSC) may rank all pilot signals reported by a mobile station in terms of their relative signal strengths (powers). It may then group the pilot signals into groups of pilot signals likely to have a high mutual correlation and reduce by a predetermined factor the reported strength of all the pilot signals except for the strongest pilot signal in each group. Candidates for handoff can then be determined in the normal way, in terms of signal strength. This would enable a balance to be struck between selecting pilot signals on the basis of signal strength and on the basis of signal correlation in order to improve reception. The predetermined strength-attenuation factor may be evaluated for optimisation of different systems, for example whether a cell is in a high or low dispersion environment. Advantageously, the predetermined factor may be between 1 dB and 10 dB, for example about 3 dB to 6 dB.

Mobile Station Modifications

In further embodiments, the mobile station may also be modified to enable pilot signal selection on the basis of correlation as well as power. For example the mobile station may incorporate a signal processing means for estimating signal correlation itself and only requesting handoff using pilot signals selected on the basis of correlation as well as power. The mobile station may for example comprise an intelligent rake that prioritises rake fingers on the basis of signal correlation.

Alternatively, the mobile station may report to the BTS all diversity components of a received pilot signal. The network could then assess handoff in respect of all the components in order to improve mobile station reception.

Uplink Beams with Correlated Fading

On the uplink, similar issues apply as have been discussed in relation to the downlink. That is, in a highly-sectored cell such as a TC9S cell, signals received from a mobile station in adjacent sectors and particularly on the same phased-array antenna are likely to have correlated fading. This applies to reception both on main beams and diversity beams. Conventionally, not all uplink signals are diversity-combined as on the downlink; on the uplink for signals received via different BTSs (soft handoff) a prior art BSC selects on a frame-by-frame basis the strongest signal received; for signals received at the same BTS, the BTS carries out symbol-by-symbol diversity combining of signals in different sectors. Most existing BTSs do this diversity combining non-coherently. Future systems will do it coherently.

Nevertheless, in the same way as on the downlink, even when diversity-combining is not performed uplink performance can be improved according to the embodiments of the invention described herein by combining uncorrelated signals, because simultaneous fading of uplink signals can then be avoided. On the uplink, when diversity-combining is performed, the embodiments of the invention may advantageously be used as on the downlink.

There are important differences between the implementation of the various aspects of the invention on the uplink and downlink. The reason for this is that unlike the mobile station, which must allocate a small fixed number of rake fingers to signal components chosen from a potentially large set of received signal components, each BTS involved in soft handoff with a given mobile station assigns a channel element (CE) to receive signals from that mobile station and each CE comprises a fixed number of rake fingers (typically four). Therefore, it is likely that all uplink signals of useful strength from a mobile station can be received and decoded. The BSC therefore has access to all the information required to combine uplink signals to maximise diversity. However, if sufficient receiver resource is available, it may be advantageous simply to combine all received uplink signals regardless of diversity considerations.

Thus, according to a third embodiment of the invention, the system comprises a diversity combiner for use when a BTS or BSC has insufficient receiver resource to combine all uplink signals which advantageously employs a combining algorithm to prioritise the combining of uncorrelated uplink signals rather than necessarily combining the signal components with the greatest signal strength, or the highest mean energy. This means prioritising the combining of signals which are not received in adjacent sectors and, in particular, combining signals from different antenna arrays. In a TC9S cell this means combining signals received in different trisectors or different cells.

The algorithm should balance the benefits of the additional diversity against the potential reduction in mean energy detected in order to optimise the reliability of data reception. The balance will be dependent upon the combiner implementation losses. These same considerations apply to the uplink and to the downlink.

Prioritising Soft Handoff Over Softer Handoff

In a TC9S cell there is a strong likelihood of correlated fading between the beams in each trisector. By contrast, in the same cell, there is much less likelihood of correlated fading between the beams of separate trisectors and, as in all cell types, there is little likelihood of correlated fading between neighbouring cells. In a TC9S cell, softer handoff enables parallel communication and diversity combining in two or more sectors of a trisector and soft handoff allows parallel communication and diversity combining between sectors in different trisectors or cells. Thus, in a TC9S cell, the embodiments of the invention described above all prioritise soft handoff, where possible (i.e. when sufficient signals of sufficient strength are received), over softer handoff in order to increase diversity on the downlink. The same would apply in any cell in which soft handoff and softer handoff occur and in which placing a mobile station in softer handoff in adjacent sectors may lead to correlated fading in the two sectors, for example because the sectors are covered by closely-spaced antennas or a phased-array antenna, or if the cell is in a low-dispersion environment. However, it is clear that the same object of increasing diversity can apply to other types of cell in which correlated fading between adjacent sectors may be a problem. For example, if a separate BTS is used to handle each sector, the handoff between adjacent sectors would always be soft, rather than softer, handoff. Nevertheless, correlated fading between adjacent sectors may occur, for example if the antennas covering the adjacent sectors are closely-spaced or a single phased-array antenna covers both adjacent sectors. Therefore, in such a cell, it would be advantageous in relation to the various aspects and embodiments of the invention described herein to prioritise soft handoff between non-adjacent sectors over soft handoff between adjacent sectors.

All aspects of the invention are based on the consideration of signal fading correlation, or expected signal fading correlation, as well as signal strength, when selecting signals for diversity combining. When a plurality of signals of different strengths and correlations are received, selection of a number of those signals (corresponding to the number of rake receiver fingers available) for optimum signal reception is a compromise between strength and correlation. As described above, insufficient information may be available (or may be transmitted by a mobile station to the BTSs and BSC) to allow the ideal handoff configuration to be determined or compromises to be assessed. However, an improvement over the prior art techniques of simply combining the strongest available signals regardless of correlation may be achieved even by simple techniques. For example, each signal may be flagged as "correlated" or "uncorrelated" depending on the BTS or sector in which the signal is received, and then selecting signals for combining on the basis of their power, weighted or prioritised by their correlation flags.

What is claimed is:

1. A method for handoff in a cellular radio communications system including a plurality of cells each having one or more sectors, one or more base transceiver stations (BTSs) in each cell, and a base station controller (BSC) coupled to said BTSs, in which communications to and from a subscriber unit such as a mobile station may be carried by signals in one or more sectors and/or one or more cells during a handoff, said method comprising the step of the BSC selecting signals for soft handoff on the basis of signal strength and expected signal correlation, expected signal correlation being assessed by considering said sector or cell in which each signal is carried, in which pilot signals are transmitted in each of a plurality of sectors and/or cells and, during a call, a subscriber unit reports to said BSC the identities and strengths of any pilot signals it receives, said BSC arranges said reported pilot signals into groups of pilot signals likely to have high correlation with each other, ranks said pilot signals within each group in order of said reported strengths, modifies said reported strengths by reducing by a predetermined factor said reported strengths of said pilot signals except for a strongest pilot signal in each group, and then assesses candidate pilot signals for handoff according to said modified signal strengths by prioritising handoff with pilot signals having the highest modified signal strengths, in which said predetermined factor is preferably between about 1 dB and 10 dB and particularly preferably between about 3 dB and 6 dB.

* * * * *